US009781550B2

(12) United States Patent
Terazaki

(10) Patent No.: US 9,781,550 B2
(45) Date of Patent: Oct. 3, 2017

(54) COMMUNICATION SYSTEM, COMMUNICATION TERMINAL, SERVER, COMMUNICATION METHOD, RECORDING MEDIUM, INFORMATION QUERY METHOD AND INFORMATION SPECIFYING METHOD

(71) Applicant: CASIO COMPUTER CO., LTD., Shibuya-ku, Tokyo (JP)

(72) Inventor: Tsutomu Terazaki, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/102,514

(22) PCT Filed: Oct. 16, 2014

(86) PCT No.: PCT/JP2014/077500
§ 371 (c)(1),
(2) Date: Jun. 7, 2016

(87) PCT Pub. No.: WO2015/098247
PCT Pub. Date: Jul. 2, 2015

(65) Prior Publication Data
US 2016/0381492 A1 Dec. 29, 2016

(30) Foreign Application Priority Data
Dec. 25, 2013 (JP) .................. 2013-266679

(51) Int. Cl.
*H04Q 7/20* (2006.01)
*H04W 4/00* (2009.01)
(Continued)

(52) U.S. Cl.
CPC ............ *H04W 4/008* (2013.01); *H04L 67/28* (2013.01); *H04L 67/42* (2013.01); *H04W 8/183* (2013.01);
(Continued)

(58) Field of Classification Search
CPC ..... H04W 4/008; H04W 8/183; H04W 60/00; H04W 72/044; H04W 4/00; H04L 67/28;
(Continued)

(56) References Cited

U.S. PATENT DOCUMENTS 8,565,679 B2 10/2013 Kurarta et al.
8,606,906 B2 12/2013 Watanabe
2016/0057223 A1* 2/2016 Puharre ............... H04L 67/1097
709/219

FOREIGN PATENT DOCUMENTS

JP 2006172223 A 6/2006
JP 2011209872 A 10/2011
(Continued)

OTHER PUBLICATIONS

Japanese Office Action dated May 10, 2016 issued in counterpart Japanese Application No. 2013-266679.
(Continued)

*Primary Examiner* — Nguyen Vo
(74) *Attorney, Agent, or Firm* — Holtz, Holtz & Volek PC

(57) ABSTRACT

A communication system includes a plurality of communication terminals and a server. The plurality of communication terminals perform wireless communication therebetween by a predetermined communication protocol. The server is to be connected with the plurality of communication terminals through a predetermined communication line. The plurality of communication terminals each include a first receiving section which receives identification information sent from another communication terminal for identifying the another communication terminal and a first sending section which sends to the server through the predetermined communication line the identification information received by the first receiving section. The server includes a second receiving section which receives the identification information sent from the communication ter-
(Continued)

minal and a specifying section which specifies, among the plurality of communication terminals, the communication terminal whose identification information has not been received based on the identification information received by the second receiving section.

16 Claims, 5 Drawing Sheets

(51) Int. Cl.
| | |
|---|---|
| *H04W 60/00* | (2009.01) |
| *H04L 29/08* | (2006.01) |
| *H04L 29/06* | (2006.01) |
| *H04W 8/18* | (2009.01) |
| *H04W 72/04* | (2009.01) |

(52) U.S. Cl.
CPC ......... *H04W 60/00* (2013.01); *H04W 72/044* (2013.01); *H04W 4/00* (2013.01)

(58) Field of Classification Search
CPC ..... H04L 67/42; H04B 5/0025; H04B 5/0031; H04B 5/02
See application file for complete search history.

(56) References Cited

FOREIGN PATENT DOCUMENTS

| JP | 2012151735 A | 8/2012 |
|---|---|---|
| JP | 2012178747 A | 9/2012 |
| JP | 2013017726 A | 1/2013 |

OTHER PUBLICATIONS

International Search Report (ISR) and Written Opinion (WO) dated Nov. 11, 2014 issued in International Application No. PCT/JP2014/077500.
International Preliminary Report on Patentability (IPRP) including Written Opinion, dated Jun. 28, 2016, issued in counterpart International Application No. PCT/JP2014/077500.

* cited by examiner

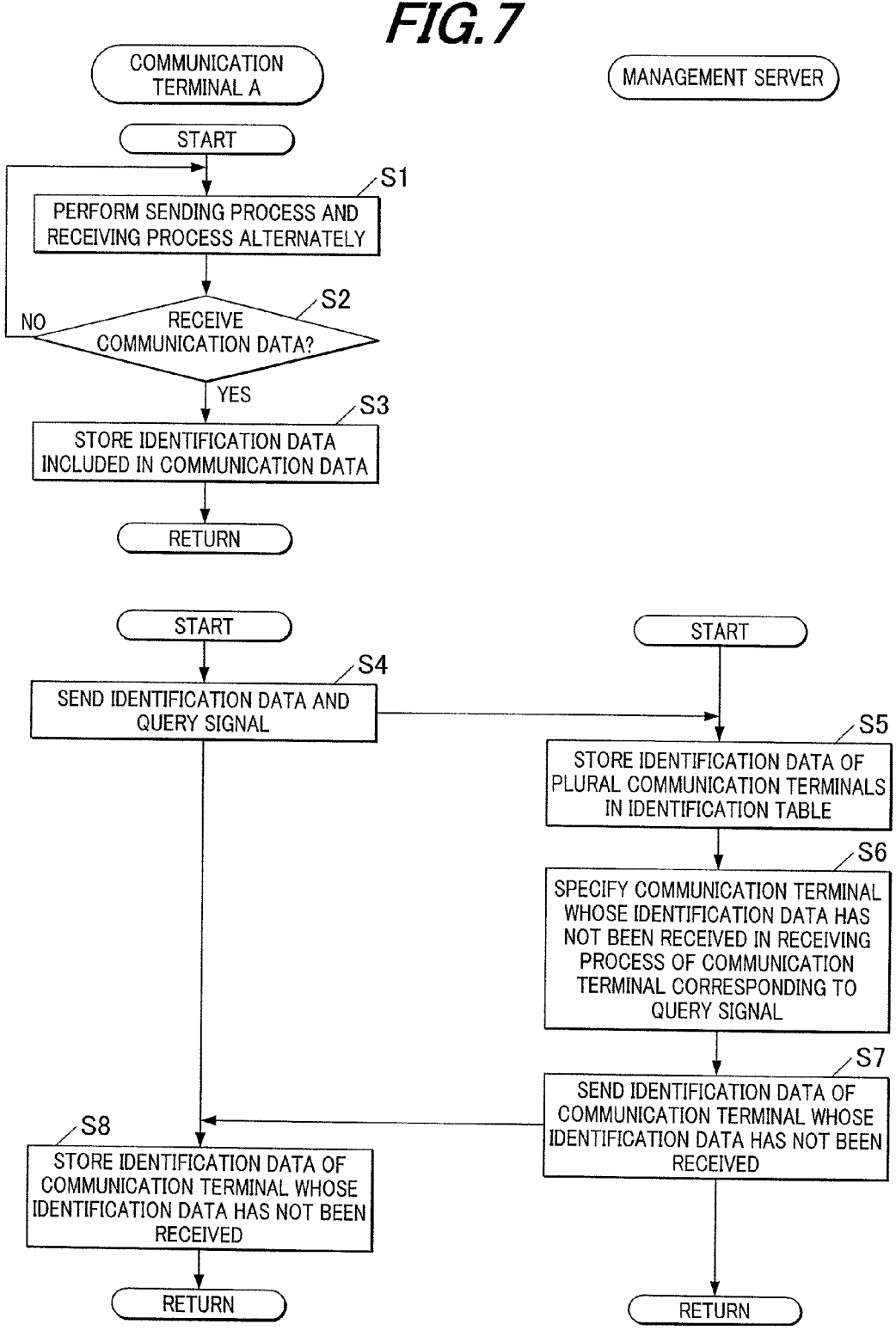

COMMUNICATION SYSTEM, COMMUNICATION TERMINAL, SERVER, COMMUNICATION METHOD, RECORDING MEDIUM, INFORMATION QUERY METHOD AND INFORMATION SPECIFYING METHOD

TECHNICAL FIELD

The present invention relates to a communication system, a communication terminal, a server, a communication method, a recording medium, an information query method and an information specifying method.

BACKGROUND ART

Some portable communication terminals including a smartphone and a game machine have short-range wireless communication functions such as Bluetooth (Registered Trademark), and can perform a data exchange with another communication terminal. The data exchange is possible even for a short time when the communication terminals pass by each other. Such a data exchange is called passing-by communication (refer to, for example, Patent Documents 1 to 3).

On the other hand, communication tools using the Internet which are called SNS (Social Networking Service) are widely used.

By taking advantage of the passing-by communication described above to exchange identification data such as an account name and a user ID of SNS, it is possible to provide a new opportunity for users who participate in the same event such as watching a soccer game and a concert to communicate with each other.

PRIOR ART DOCUMENT

Patent Document

Patent Document 1: JP 2011-209872 A
Patent Document 2: JP 2012-151735 A
Patent Document 3: JP 2013-17726 A

SUMMARY OF INVENTION

Problem to be Solved by the Invention

However, in the case of passing-by communication in which data communication is carried out without establishing a connection for saving electric power, the bidirectionality of communication is not assured. That is, data communication cannot be carried out when the timing of a receiving process and a sending process does not match each other among a plurality of communication terminals. Thus, for example, such situation may occur that data of one communication terminal is received, while data of the other communication terminal is not received.

An object of the present invention is to provide a communication system, a communication terminal, a server, a communication method, a recording medium, an information query method and an information specifying method which make it possible to suppress a receipt failure in passing-by communication and to assure the bidirectionality of communication.

Means for Solving the Problem

In accordance with one aspect of the present invention, to solve the above mentioned object, there is provided a communication system including:

a plurality of communication terminals which perform wireless communication therebetween by a predetermined communication protocol; and a server which is to be connected with the plurality of communication terminals through a predetermined communication line, wherein the plurality of communication terminals each include:

a first receiving section which receives identification information sent from another communication terminal for identifying the another communication terminal; and a first sending section which sends to the server through the predetermined communication line the identification information received by the first receiving section, and wherein the server includes:

a second receiving section which receives the identification information sent from the communication terminal; and a specifying section which specifies, among the plurality of communication terminals, the communication terminal whose identification information has not been received based on the identification information received by the second receiving section.

Effects of the Invention

In accordance with the present invention, it is possible to suppress a receipt failure in passing-by communication and to virtually assure the bidirectionality of communication.

BRIEF DESCRIPTION OF DRAWINGS

FIG. 7 is a flowchart showing processing of compensate the receipt failure of the identification data.

DESCRIPTION OF PREFERRED EMBODIMENTS

Hereinafter, a specific aspect of the present invention will be described with reference to the drawings. The scope of the invention is not limited to illustrated examples.

Figure 1:
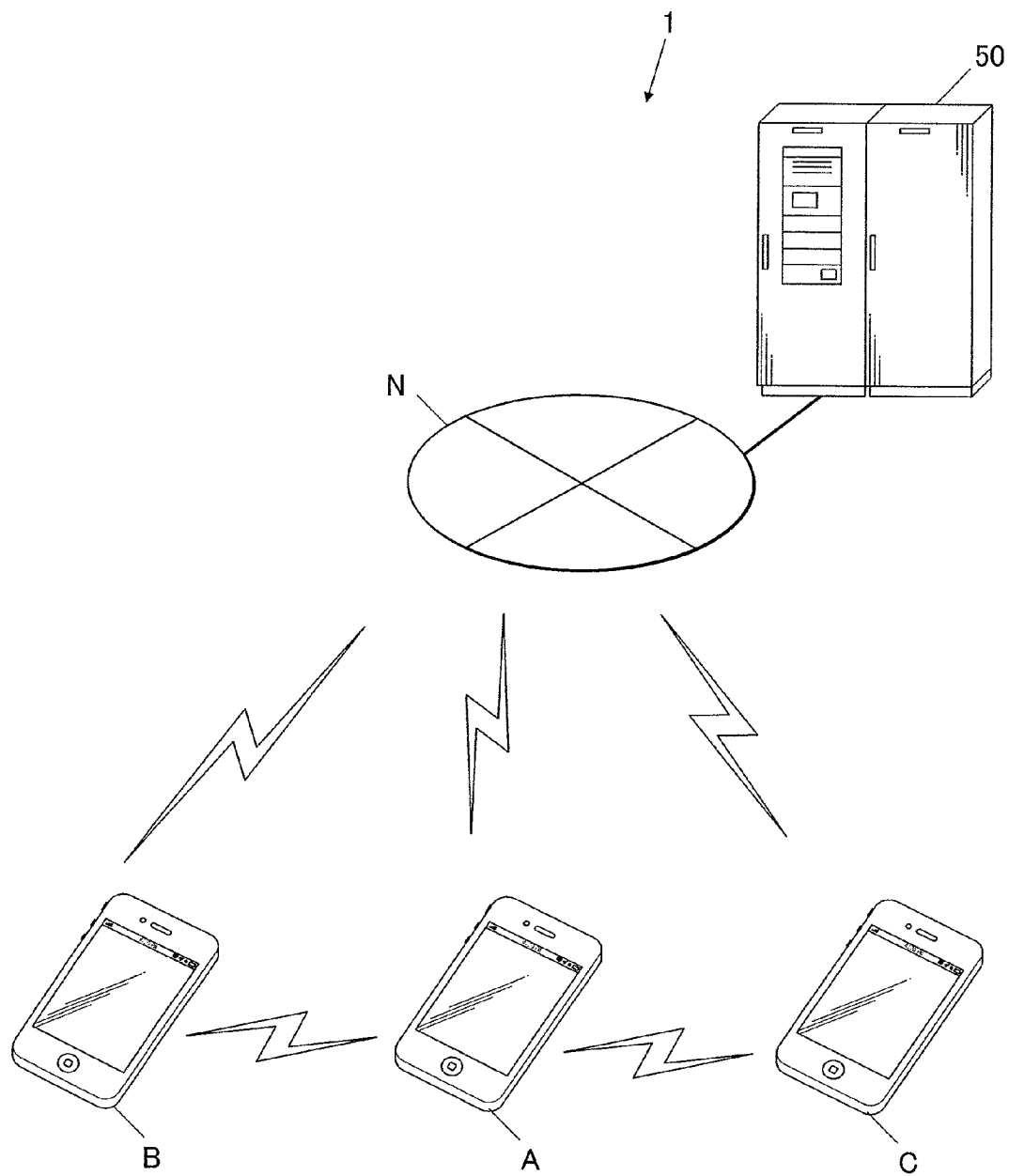
FIG. 1 is a view showing schematic configuration of a communication system according to an embodiment to which the present invention is applied.

FIG. 1 shows a schematic configuration of a communication system 1 of an embodiment of the present invention.

As shown in FIG. 1, the communication system 1 includes a plurality of communication terminals (FIG. 1 shows three communication terminals A, B and C) and a management server 50. Each of the communication terminals A, B and C and the management server 50 are connected with each other via a network N such as the Internet.

The communication terminals A, B and C are smartphones each having a short-range wireless communication function, for example, and can send to and receive from other communication terminals A, B and C communication data. The communication terminals A, B and C may be game machines, watches, pedometers (registered trademark) and data recording devices for running, if such portable communication terminals have similar wireless communication functions.

Since the communication terminals A, B and C have substantially the same base configuration for exchanging communication data with each other through wireless communication, the communication terminal A will be described hereinafter as an example.

Figure 2:
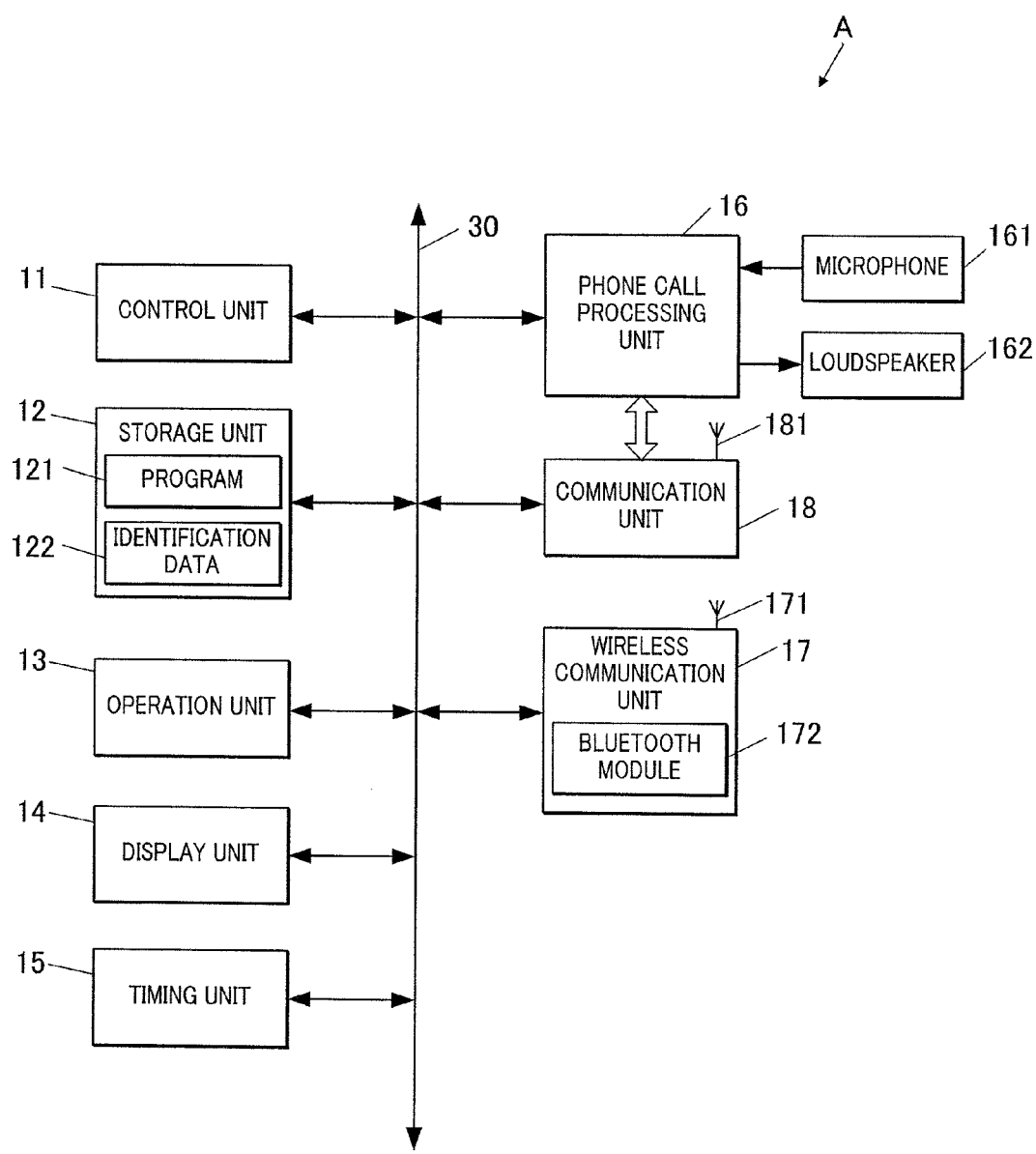
FIG. 2 is a functional block diagram of a configuration of a communication terminal.

FIG. 2 is a functional block diagram showing a configuration of the communication terminal A by the functions thereof.

As shown in FIG. 2, the communication terminal A includes a control unit 11, a storage unit 12, an operation unit 13, a display unit 14, a timing unit 15, a microphone 161, loudspeaker 162, a phone call processing unit 16, a wireless communication unit 17 and a communication unit 17. Components of the communication terminal A are connected with each other via bus 30.

The control unit 11 includes a CPU (Central Processing Unit) and a RAM (Random Access Memory), for example. The control unit 11 reads a program 121 stored in the storage unit 12, and executes the program 121 to control the operation of each component of the communication terminal A.

For example, the control unit 11 executes a program for processing a phone call when a telephone call is instructed through the operation unit 13, and makes the phone call processing unit 16 and the communication unit 18 exchange speaking voice with the communication terminal B or C which is called.

The storage unit 12 stores the program 121 which can be read by the control unit 11 and data necessary for executing the program 121.

A recording medium such as a hard disk, an EEPROM (Electrically Erasable Programmable ROM) and a flash memory can be used for the storage unit 12.

The storage unit 12 stores identification data 122 of other communication terminals (for example, the communication terminals B, C).

That is, when the wireless communication unit 17 performs a receiving process, the storage unit 12 (first storage section) stores the identification data 122 included in received communication data which is sent from another communication terminal which performs a sending process.

The wireless communication unit 17 may acquire receipt time of the identification data 122 (communication data) from the timing unit 15, for example, and the storage unit 12 may store the receipt time when the wireless communication unit 17 received identification data 122 in association with the identification data 122.

The operation unit 13 includes operation keys and a touch panel, for example, and generates an operation signal in accordance with an operation thereof by a user and outputs the operation signal to the control unit 11.

The display unit 14 includes an LCD (Liquid Crystal Display), an organic EL (Electro Luminescence) display, or the like, and displays a display screen image such as an operation screen and a notification screen in accordance with a display control by the control unit 11.

The timing unit 15 carries out timing based on clock signals output from an oscillator and outputs current time.

Speaking voice is input through the microphone 161.

The phone call processing unit 16 performs an A/D conversion of the speaking voice input by the microphone 161, performs an encoding to generate a base band signal of the speaking voice, and outputs to the communication unit 18. The phone call processing unit 16 performs a decoding of the base band signal of the speaking voice input by the communication unit 18 and performs a D/A conversion to output to the loudspeaker 162.

The loudspeaker 162 outputs the received voice.

The wireless communication unit 17 includes an antenna 171 for Bluetooth and a Bluetooth module 172. The wireless communication unit 17 sends to and receives from another communication terminal B or C communication data by the Bluetooth module 172 through the antenna 171.

The Bluetooth module 172 employs the communication protocol of BLE (Bluetooth Low Energy) for sending and receiving communication data.

The communication protocol of BLE alternates a sending mode and a receiving mode at regular intervals, wherein in the sending mode only sending communication data to another communication terminals B or C is performed and in the receiving mode only receiving communication data sent from another communication terminals B or C is performed. The sending mode is called Advertise and the receiving mode is called Scan.

The wireless communication unit 17 sends communication data to another communication terminal B or C in the sending mode and receives communication data from another communication terminal B or C in the receiving mode in accordance with the communication protocol of BLE in which the sending mode and the receiving mode are alternated.

In accordance with BLE, the communication data can be exchanged without establishing a connection.

Figure 3:
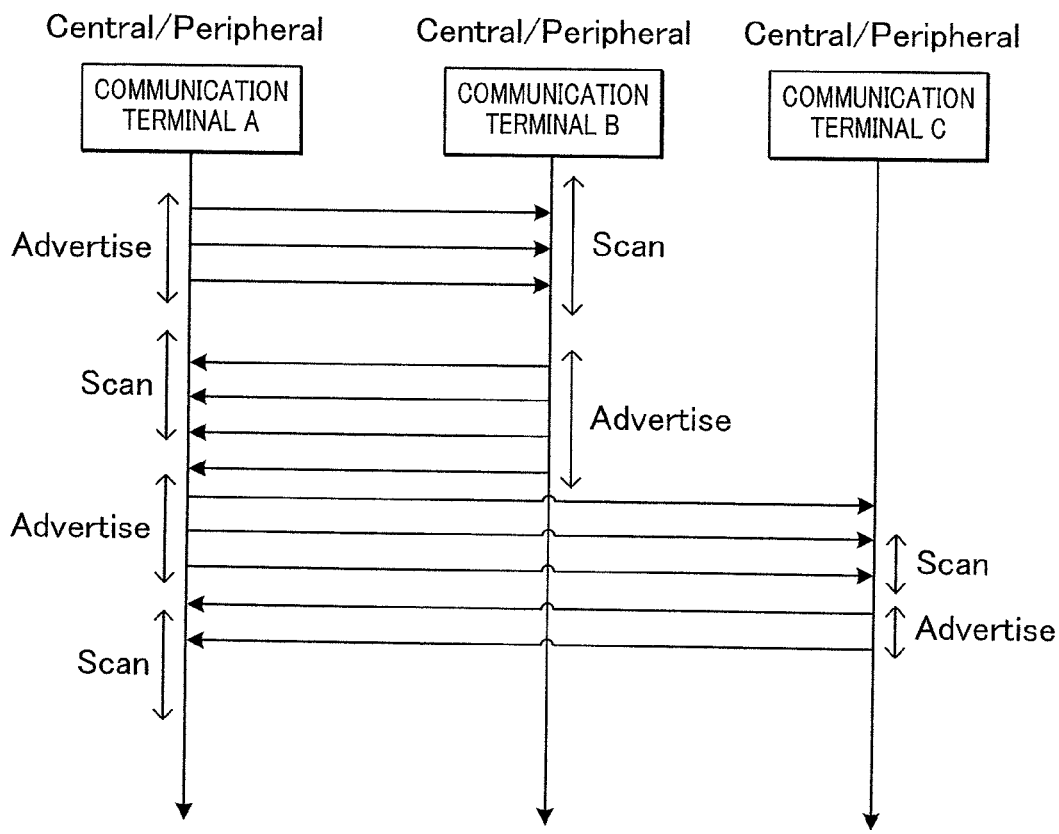
FIG. 3 is a timing diagram of a case where data is exchanged without establishing a connection in accordance with BLE (Bluetooth Low Energy) communication protocol.

FIG. 3 is a timing chart in case where three communication terminals A, B and C exchange communication data without establishing connections therebetween.

As shown in FIG. 3, each of the communication terminals A, B and C alternates the sending mode shown by Advertise and the receiving mode shown by Scan, and alternately plays a role of Central and a role of Peripheral.

The wireless communication unit 17 switches the sending mode and the receiving mode at predetermined duration as shown in FIG. 3. In the specific, the wireless communication unit 17 includes a counter, and counts time by the counter to switch from the sending mode to the receiving mode and vice versa when the counted time reaches a switching timing.

The duration of the sending mode and the receiving mode can be set for each of the communication terminals A, B and C. Thus, if one of the communication terminals is in the sending mode and another of the communication terminals is in the receiving mode, the communication data can be exchanged. For example, when the sending mode of the communication terminal A and the receiving mode of the communication terminal B are overlapped, the communication terminal B can receive the communication data sent from the communication terminal R.

Figure 4:
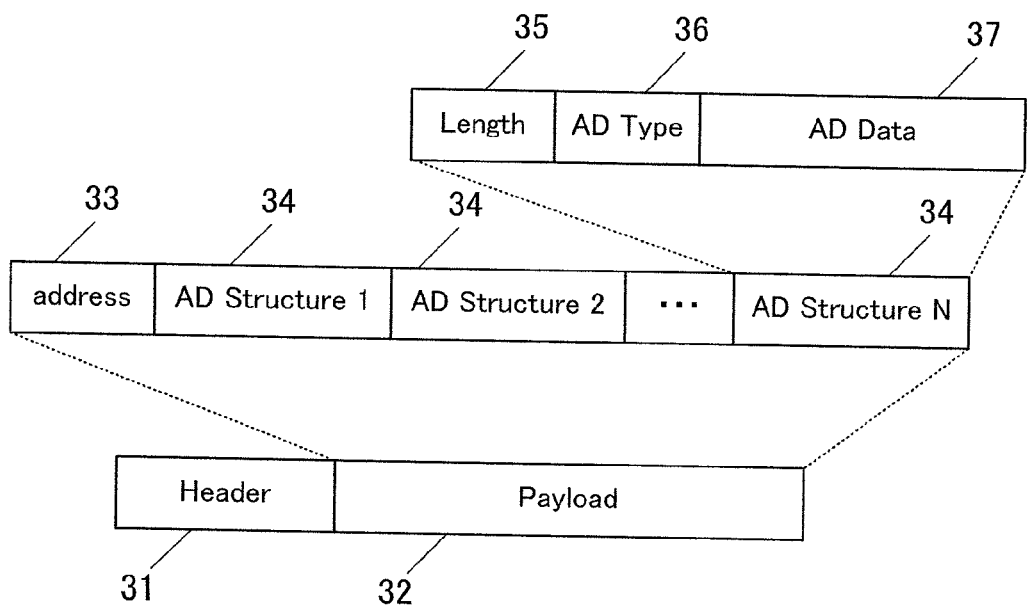
FIG. 4 is a format of communication data in accordance with BLE communication protocol.

FIG. 4 shows the format of the communication data in BLE.

As shown in FIG. 4, the communication data is packet data composed of Header 31 and Payload 32. The Payload 32, which constitutes substantial data, is composed of an address 33 at the beginning of the Payload 32 and N AD structures N 34. The address 33 shows the addresses of the AD structure N 34.

Each of AD structure N 34 is composed of Length 35, AD Type 36 and AD Data 37. The Length 35 defines a data length of the AD Structure N 34. The AD Type 36 stores a flag which describes the kind of data which is stored in the AD Data 37. When the AD Type 36 stores the flag of 0xFF, the AD Data 37 can store specific data.

The specific data means any data which can be distributed to another communication terminal B or C without being restricted by BLE. Examples of data which can be stored in the AD Data 37 as the specific data include a message data set by a user for a distribution, and the identification data 122 such a user ID and an account name issued in a service a user is using, and a terminal ID specific to the communication terminal A.

In this way, the wireless communication unit 17 alternates the sending process of communication data including the identification data 122 to identify each communication terminal and the receiving process of communication data including the identification data 122 sent from other communication terminal (for example, the communication terminal B, C) at predetermined intervals.

That is, the wireless communication unit 17 makes, as a control section, one of the sending process of the identification data 122 to identify each communication terminal and the receiving process of the identification data 122 sent from another communication terminal (for example, the communication terminal B, C) be performed sequentially and alternatively. The wireless communication unit 17 as a first receiving section receives the identification data 122 sent from another communication terminal (for example, the communication terminal B, C) which performs a sending process when the communication terminal A performs the receiving process.

In the sending process of the identification data 122, the wireless communication unit 17 may send the identification data 122 in association with the current position of the communication terminal A detected by a position detection unit (not shown) such as GPS (Global Positioning System) module.

The communication unit 18 includes an antenna 181 for RF (Radio Frequency) communication, and sends to and receives from a base station speaking voice and mail, for example, via the antenna 181.

In the specific, the communication unit 18 demodulates the radio wave received via the antenna 181, and outputs the base band signal of the speaking voice and the packets of mail, for example, to the phone call processing unit 16 and the control unit 11, respectively. The communication unit 18 sends radio waves obtained by modulating the packets of mail input from the control unit 11 or the base band signal input from the phone call processing unit 16 to the base station via the antenna 181.

The communication unit 18 can also perform sending and receiving via the network N by connecting to an access point of a wireless LAN (Local Area Network) through WiFi (Wireless Fidelity).

The communication unit 18 (first sending section) sends to the management server 50 via network N the identification data 122 of another communication terminal (for example, the communication terminal B, C) received by the wireless communication unit 17. In the specific, the communication unit 18 reads and acquires the identification data 122 of another communication terminal stored in the storage unit 12 to send to the management server 50 via network N.

The communication unit 18 may send to the management server 50 via network N the identification data 122 of another communication terminal received by the wireless communication unit 17 in association with the receipt time of the identification data 122. That is, the communication unit 18 may read and acquire from the storage unit 12 the receipt time of the identification data 122 which was received by the wireless communication unit 17 wherein the receipt time of the identification data 122 is stored in association with the identification data 122 of another communication terminal.

The communication unit 18 sends to the management server via network N a query signal for querying whether the identification data 122 of another communication terminal (for example, the communication terminal B, C) has not been received in the receiving process of the communication terminal A.

Figure 5:
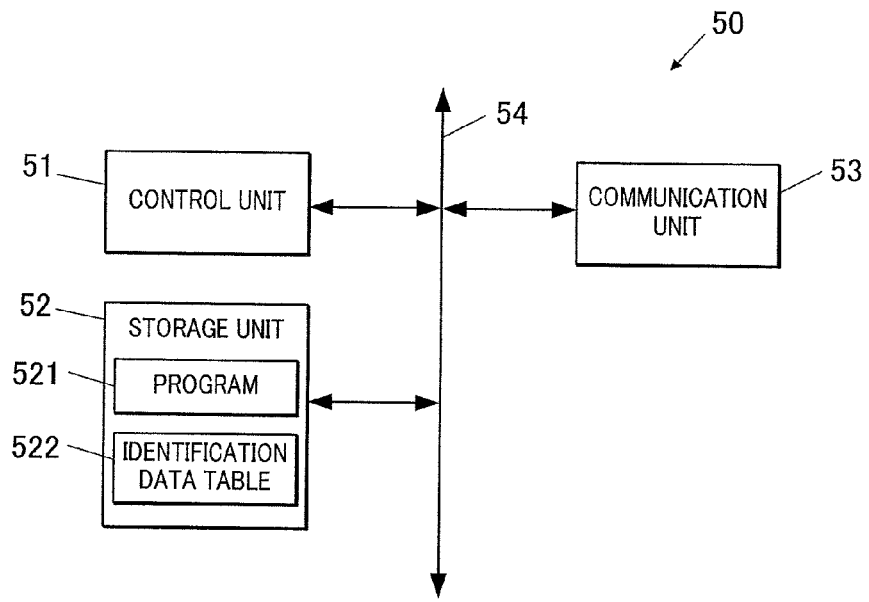
FIG. 5 is a functional block diagram of a management server.

FIG. 5 is a functional block diagram showing a configuration of the management server 50 by the functions thereof.

As shown in FIG. 5, the management server 50 includes a control unit 51, a storage unit 52 and a communication unit 53. These components are connected with each other via bus 54.

The control unit 51 includes a CPU and a RAM, for example. The control unit 51 reads a program 521 stored in the storage unit 52, and controls the operation of each component of the management server 50 by executing the program 521.

The control unit 51 (specifying section) specifies, based on the identification data 122 received by the communication unit 53, the communication terminal whose identification data 122 has not been received wherein the identification data is to be received in the receiving process of at least one communication terminal (for example, the communication terminal A) among three communication terminals A, B and C.

That is, when the communication unit 53 receives the query signal sent from one of the communication terminals (for example, the communication terminal A) for example, the control unit 51 specifies the communication terminal whose identification data 122 to be received in the receiving process of the communication terminal has not been received. In the specific, the control unit 51 (determination section) determines, based on the identification data 122 received by the communication unit 53, whether a first communication terminal (for example, the communication terminal A) receives the identification data 122 of a second communication terminal (for example, the communication terminal B, C) which has received the identification data 122 of the first communication terminal and which is different from the first communication terminal.

For example, the control unit 51 acquires, with reference to an identification data table 522 (described below), the identification data 122 (for example, identification data ID-B) of another communication terminal(s), which is other than the first communication terminal, being associated with the identification data 122 of the first communication terminal (for example, the communication terminal A) which sent the query signal, and the identification data 122 (for example, identification data ID-A and ID-C) of another communication terminal(s), which is other than the second communication terminal, being associated with the identification data 122 of the second communication terminal (for example, the communication terminal B, C). When the control unit 51 determines that the first communication terminal has not received the identification data 122 (for example, identification data ID-C) of the second communication terminal (for example, the communication terminal C), the control unit 51 specifies the second communication terminal as the communication terminal whose identification data 122 to be received in the receiving process of the first communication terminal has not been received.

In case where the identification data 122 of another communication terminal in association with the receipt time of the identification data 122 is sent from each communication terminal and is received by the communication unit 53, the control unit 51 may determine, based on the identification data 122 and receipt time thereof received by the communication unit 53, whether a first communication terminal (for example, the communication terminal A) receives, within a predetermined time with reference to a predetermined time when a second communication terminal (for example, the communication terminal B) receives the identification data 122 (for example, identification data ID-A) of the first communication terminal, identification data (for example, identification data ID-C) of a third communication terminal (for example, the communication terminal C) which is different from the second communication terminal. When the control unit 51 determines that, as a determination result, the first communication terminal does not receive the identification data 122 of the third communication terminal within the predetermined time, the control unit 51 may specify the third communication terminal as a communication terminal whose identification data 122 to be received in the receiving process of the first communication unit has not been received.

The storage unit 52 stores a program 521 which can be read by the control unit 51 and data necessary to execute the program 521.

A recording medium such as a hard disk, an EEPROM and a flash memory can be used for the storage unit 52.

The storage unit 52 stores the identification data table 522 in which each of the communication terminals A, B and C is associated with the identification data 122 of another communication terminal(s) which is other than each of the communication terminal A, B and C, respectively.

The identification data table 522 (second storage section) stores the identification data 122 of each of the communication terminals A, B and C and the identification data 122 of another communication terminal(s) (for example, the communication terminal B for the communication terminal A) sent from each of the communication terminals A, B and C via network N and received by the communication unit 53 in association with each other.

The communication unit 53 includes a communication interface such as a network interface card, and performs communication with each of the communication terminals A, B and C on the network N.

The communication unit 53 (second receiving section) receives the identification data 122 of another communication terminal(s) (for example, the communication terminal for the communication terminal A) sent from each of the communication terminals A, B and C via network N.

The communication unit 53 (second sending section) sends the identification data 122 of the communication terminal to be received in the receiving process of one of the communication terminals (for example, the communication terminal A) to the one of the communication terminal through the network N (refer to FIG. 6) wherein the one of communication terminals is specified by the control unit 51. In the specific, the communication unit 53 receives a query signal sent from any one of the communication terminals A, B and C (for example, the communication terminal A). The communication unit 53 sends to the communication terminal which sent the query signal via network N the identification data 122 of the communication terminal specified by the control unit 51 as a communication terminal whose identification data 122 has not been received.

The communication terminal which sends a query signal may be any one of three communication terminals A, B and C and a plurality of communication terminals may send query signals.

A process performed by the communication system to compensate the identification data 122 which has not been received will be described with reference to FIG. 7.

FIG. 7 is a flowchart showing a procedure of a process to compensate the identification data 122 which has not been received.

As shown in FIG. 7, the wireless communication unit 17 of the communication terminal A alternates a sending process and a receiving process at regular intervals, wherein in the sending process communication data including the identification data 122 to identify each communication terminal is sent and in the receiving process communication data including the identification data 122 sent from another communication terminal(s) (for example, the communication terminals B, C) is received (Step S1). The wireless communication unit 17 determines whether the communication data is received in the receiving process from another communication terminal which performs the sending process (Step S2).

If it is determined that the communication data is not received in Step S2 (Step S2; NO), the wireless communication unit 17 shifts the processing back to Step S1 and processes thereafter are performed sequentially.

On the other hand, if it is determined that the communication data is received in Step S2 (Step S2, YES), the storage unit 12 stores the identification data 122 included in the communication data received by the wireless communication unit 17 under the control of the control unit 11 (Step S3). In this case, the storage unit 12 may store the identification data 122 and the receipt time of the identification data 122 by received the wireless communication unit 17 associated with each other.

While the example of the communication terminal A is described, substantially the same processes are performed in the other communication terminals (for example, the communication terminals B, C).

Then, a query as to whether the identification data 122 has not been received is performed at a timing when a user of the communication terminal A wishes. The query as to whether the identification data 122 has not been received may be performed from the communication terminals B and/or C. The processes of the communication terminals B and/or C are substantially the same as that of the communication terminal A, and thus, the example of the communication terminal A will be explained as a representative example.

In the specific, when a query as to whether the identification data 122 has not been received is instructed based on a predetermined operation of the operation unit 13 by a user, the communication unit 18 reads and acquires the identification data 122 of another communication terminal(s) stored in the storage unit 12 under the control of the control unit 11 to send to the management server 50 via network N in association with a query signal for performing a query as to another communication terminal(s) (for example, the communication terminals B, C) whose identification data 122 has not been received in the receiving process of the communication terminal A (Step S4).

The timing of sending the identification data 122 and the query signal from another communication terminal(s) may be shifted, for example.

When the identification data 122 of another communication terminal(s) sent from the communication terminal A is received by the communication unit 53 of the management server 50, the storage unit 52 stores, in the identification data table 522, the identification data 122 of the communication terminal A and the identification data 122 of the other communication terminal(s) associated with each other under the control of the control unit 51 (Step S5).

For example, in the case of the communication terminals B and C, when the identification data 122 of another communication terminal(s) is sent from the communication terminals B and C and is received by the communication unit 53, the storage unit 52 stores, in the identification data table 522, the identification data 122 of the communication terminals B and C and the identification data 122 of the other communication terminal(s) associated with each other.

When the query signal sent from the communication terminal A is received by the communication unit 53, the control unit 51 specifies the communication terminal whose identification data 122 to be received in the receiving process of the communication terminal A has not been received (Step S6).

For example, the control unit 51 refers to the identification data table 522 of the storage unit 52 and acquires the identification data 122 of another communication terminal(s) (for example, the communication terminals B, C) which is associated with the identification data 122 of the communication terminal A which sent the query signal and identification data 122 of a communication terminal(s) which is associated with the identification data 122 of the communication terminals B and C which received the identification data 122 of the communication terminal A. With reference to the example of FIG. 6, the communication terminal A receives the identification data ID-B of the communication terminal B, but does not receive the identification data ID-C of the communication terminal C. Since the communication terminal C receives the identification data ID-A of the communication terminal A, it is considered that the communication terminals A and C passed by each other and it is determined that the communication terminal A did not receive the identification data of the communication terminal C. If the control unit 51 determines that the communication terminal A has not received the identification data 122 of the communication terminal C, the control unit 51 specifies the communication terminal C as a communication terminal whose identification data 122 to be received in the receiving process of the communication terminal A has not been received.

In case where the identification data 122 of another communication terminal sent from each of the communication terminals is stored in the identification data table 522 in association with the receipt time of the identification data 122, for example, the control unit 51 may specify the communication terminal whose identification data 122 has not been received based on the receipt time of the identification data 122.

Figure 6:
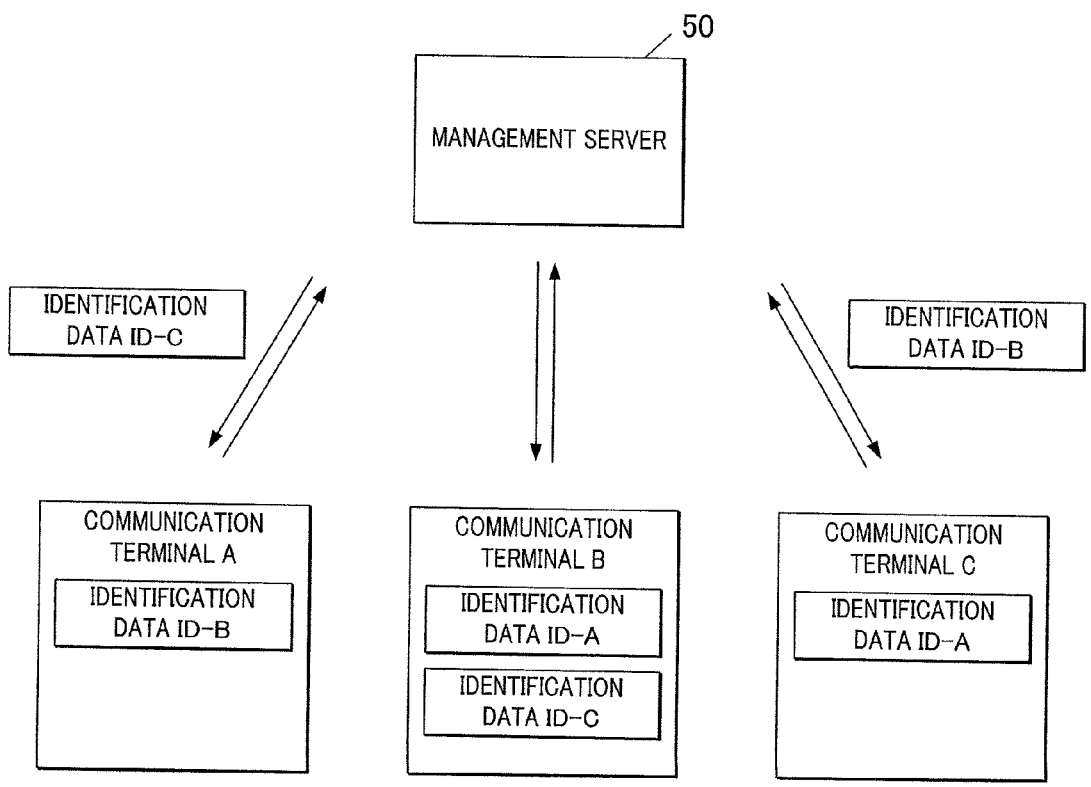
FIG. 6 is a view for explaining a receipt failure of identification data.

Next, the communication unit 53 sends to the communication terminal A through the network N the identification data 122 of the communication terminal C whose identification data 122 to be received in the receiving process of the specified communication terminal A under the control of the control unit 51 (Step S7; Refer to FIG. 6).

In the communication terminal A, the storage unit 12, under the control of the control unit 11, stores the identification data 122 of the communication terminal C received by the communication unit 18, in other words, the identification data 122 of the communication terminal C whose identification data 122 has not been received (Step S8) and the processing ends.

As described above, according to the communication system 100 of the present embodiment, a plurality of communication terminals A, B and C perform one of the sending process of the identification data 122 for identifying each communication terminal and the receiving process of the identification data 122 sent from a communication terminal alternatively and sequentially (for example, by switching at regular intervals), and the management server 50 specifies, based on the identification data 122 received from a communication terminal which performs the sending process in the receiving process, a communication terminal whose identification data 122 to be received in the receiving process of at least one of the communication terminals, and thus, receipt failure can be suppressed in passing-by communication in which data communication is performed without establishing a connection between the communication terminals.

That is, in the passing-by communication using Bluetooth Low Energy as a communication protocol, for example, since data communication cannot be carried out if the timing of the receiving processes and the sending processes of a plurality of the communication terminals A, B and C does not match one another, a receipt failure of the identification data 122 may occur. A communication terminal whose identification data 122 to be received in one of the communication terminals has not been received is specified, the identification data 122 of the specified communication terminal is sent to the one of the communication terminals whereby receipt failure can be compensated and the bidirectional communication can be established virtually.

In the specific, in case where a plurality of users having a plurality of communication terminals A, B and C participate in the same event (for example, watching a soccer game) held at a predetermined place, each of the communication terminals can receive the identification data 122 of another communication terminal existing within a predetermined distance, namely the plurality of communication terminals within a predetermined distance can exchange the identification data thereof. Under such a circumstance, even if a receipt failure occurs in passing-by communication, for example, the management server 50 determines whether a first communication terminal (for example, the communication terminal A) among the plurality of communication terminals A, B and C has received the identification data 122 of a second communication terminal (for example, the communication terminal B, C) which has received the identification data 122 of the first communication terminal. If the management server 50 determines that the first communication terminal has not received the identification data 122 of the second identification terminal (for example, the communication terminal C), the management server 50 properly specifies the second communication terminal as a communication terminal whose identification data 122 to be received in the receiving process of the first communication terminal.

In case where the management server 50 is employed for managing a predetermined SNS (Social Networking Service) relating to holding an event, for example, a query signal for querying a receipt failure of the identification data 122 can be sent by taking advantage of an opportunity for a user who participates in the event to access the management server 50. In response to the query signal, the management server 50 can specify the communication terminal whose identification data 122 has not been received and send the identification data 122 of the specified communication terminal to the communication terminal which sent the query signal.

When the management server 50 manages profile information of the users, for example, it is possible to query the information concerning a category (s) (for example, a hobby, an age-group and sex) of a user with whom the user of the communication terminal which sends a query signal wants to communicate. The management server establishes priorities in accordance with the categories and responds with the priorities, whereby a user can properly select another user (s) the user would like to communicate with even when many people participate in the same event.

Furthermore, by taking advantage of the receipt time of the identification data 122, the management server 50 determines whether a first communication terminal (for example, the communication terminal A) receives the identification data 122 of a third communication terminal (for example, the communication terminal C) received by a second communication terminal (for example, the communication terminal B) within a predetermined time with reference to the receipt time when the second communication terminal received the identification data 122 of the third communication terminal. When it is determined that the first communication terminal does not receive the identification data 122 of the third communication terminal within the predetermined time, the third communication terminal can be properly specified as a communication terminal whose identification data 122 to be received in the receiving process of the first communication terminal has not been received.

That is, for example, among a plurality of communication terminals A, B and C, when it is determined that the first communication terminal (for example, the communication terminal A) has not received the identification data 122 of the third communication terminal (for example, the communication terminal C) which is received by the second communication terminal (for example, the communication terminal B) which received the identification data 122 of the first communication terminal, the third communication terminal may not be specified as a communication terminal whose identification data 122 to be received in the receiving process of the first communication terminal has not been received because the users may pass by each other in accident without participating in the same event, for example.

Since the plurality of communication terminals A, B and C each store, during the receiving processes, the received identification data 122 sent from another communication terminal which performs a sending process and send the stored identification data 122 to the management server, specifying a communication terminal whose identification data 122 has not been received is possible at a user's desired timing.

Each of the communication terminals A, B and C sends to the management server 50 the received identification data 122 sent from another communication terminal which performs a sending process. The management server 50 stores the identification data 122, and can properly specify the communication terminal whose identification data 122 to be received in the receiving process of at least one of the plurality of communication terminals A, B and C.

The present invention is not limited to the embodiment described above, and various improvement and changes in design thereof may be made without departing from the spirit of the present invention.

For example, in the embodiment described above, the management server 50 is configured to, in response to the query signal sent from each of the communication terminals A, B and C, specify the communication terminal whose identification data to be received in the receiving process of the communication terminal has not been received. However, this is an example and the present invention is not limited thereto. Even if the query signal is not sent from each of the communication terminals A, B and C, the management server 50 may specify the communication terminal whose identification data has not been received at a predetermined timing such as a timing when the management server 50 received the identification data of another communication terminal sent from each of the communication terminals A, B and C.

Furthermore, the management server 50 may send, at a predetermined timing, the identification data of the specified communication terminal whose identification data has not been received even if the query signal is not sent from each of the communication terminals A, B and C.

The configuration of the communication system 1 and the configuration of the communication terminal A, B and C and the management server 50 in the communication system 1 are shown in the embodiment described above as examples, and are not limited thereto.

In the embodiment described above, the communication terminals A, B and C employ the communication protocol of BLE among the communication terminals. However, the communication terminal is not limited thereto.

In the embodiment described above, a function of the communication server 50 as a receiving section is realized by the communication unit 53 activated under the control of the control unit 51 of the management server 50. However, the function as the receiving section is not limited thereto. The function as the receiving section may be realized by the CPU of the control unit 51 executing a predetermined program, for example.

That is, a program memory (not shown) which stores a program stores a program including a receiving processing routine. In this case, the CPU of the control unit 51 is configured to function as a section which receives the identification data 122 of a communication terminal sent from a plurality of communication terminals A, B and C.

In the embodiment described above, a function of a specifying section which specifies, among a plurality of communication terminals A, B and C, the communication, terminal whose identification data 122 has not been received based on the received identification data 122 is realized by the CPU of the control unit 51 of the management server 50 executing a predetermined program, for example. However, the configuration of the specifying section is not limited thereto. For example, the configuration of the specifying section may be realized by a specific part (not shown) composed of a predetermined logic circuit, for example.

In the embodiment described above, functions of the receiving section and sending section of each of the communication terminals A, B and C are realized by the wireless communication unit 17 and the communication unit 18 activated under the control of the control unit 11 of the communication terminals A, B and C. However, the configuration of the receiving section and sending section is not limited thereto. The configuration of the receiving section and sending section may be realized by the CPU of the control unit 11 executing a predetermined program.

That is, a program memory (not shown) which stores a program stores a program including a receiving processing routine and a sending processing routine. In this case, in accordance with the receiving processing routine, the CPU the control unit 11 may function as a section which receives the identification data 122 sent from another communication terminal. In accordance with the sending processing routine, the CPU of the control unit 11 may also function as a sending section which sends, based on the identification data 122 sent from a plurality of communication terminals A, B and C to identify each of the communication terminals A, B and C, the received identification data 122 to the management server 50 which specifies a communication terminal whose identification data 122 has not been received among a plurality of communication terminals A, B and C through a predetermined communication line.

Furthermore, as a computer-readable medium having the programs thereon to carry out each of the processes described above, a ROM, a hard disk, a nonvolatile memory such as a flash memory, a portable recording medium such as a CD-ROM may be used. As a medium to provide a program data through a predetermined communication line, carrier waves may also be applied.

Although several embodiments of the present invention are described, the scope of the present invention is not limited to the embodiment described above, but includes the scope of the claims and its equivalents.

INDUSTRIAL APPLICABILITY

As described above, the present invention can suppress receipt failures in passing-by communication using Bluetooth Low Energy as a communication protocol and is preferably applicable to technology which virtually enables the bidirectionality of communication.

DESCRIPTION OF REFERENCE NUMERALS communication system
A, B, C communication terminal
11 control unit
12 storage unit
17 wireless communication unit
18 communication unit
50 management server
51 control unit
52 storage unit
53 communication unit
N network

The invention claimed is:

1. A communication system comprising:
a plurality of communication terminals which perform wireless communication therebetween by a predetermined communication protocol, wherein the communication terminals include a first communication terminal and a second communication terminal; and
a server which connects with the communication terminals through a network,
wherein the first communication terminal includes:
a first receiving section which receives identification information sent from the second communication terminal for identifying the second communication terminal; and
a first sending section which sends to the server through the network the identification information received by the first receiving section, and
wherein the server includes:
a second receiving section which receives the identification information sent from the first communication terminal; and
a specifying section which specifies identification information of another communication terminal that has not been received by the first communication terminal, based on the identification information received by the second receiving section.

2. The communication system according to claim 1, wherein the server further includes:
a second sending section which sends the identification information specified by the specifying section to the first communication terminal through the network.

3. The communication system according to claim 2, wherein the first communication terminal further sends to the server through the network a query signal to query whether any identification information has not been received by the first communication terminal, and
wherein, in the server:
the specifying section specifies the another communication terminal whose identification information has not been received by the first communication terminal when the query signal sent from the first communication terminal is received, and
the second sending section sends through the network the identification information of the another communication terminal specified by the specifying section to the first communication terminal which sent the query signal.

4. The communication system according to claim 1, wherein the server further includes:
a determination section which determines whether, among the communication terminals, the first communication terminal receives the identification information of the another communication terminal which is different from the first communication terminal and which has received the identification information of the first communication terminal, and
wherein the specifying section specifies, when the determination section determines that the first communication terminal has not received the identification information of the another communication terminal, the another communication terminal as a communication terminal whose identification information has not been received by the first communication terminal.

5. The communication system according to claim 4, wherein, in the first communication terminal, the first sending section further sends the identification information received by the first receiving section to the server through the network in association with a receipt time of the identification information, and
wherein, in the server:
the determination section further determines, based on the identification information and receipt time received by the second receiving section, whether the first communication terminal has received the identification information of a third communication terminal different from the second communication terminal which was received by the second communication terminal within a predetermined time with reference to a receipt time of the identification information of the first communication terminal received by the second communication terminal, and
the specifying section specifies, when the determination section determines that the first communication terminal has not received the identification information of the third communication terminal within the predetermined time, the third communication terminal as the another communication terminal whose identification information has not been received by the first communication terminal.

6. The communication system according to claim 1, wherein the first communication terminal further includes a first storage section which stores the identification information received by the first receiving section, and the first sending section sends the identification information stored in the first storage section to the server through the network.

7. The communication system according to claim 1, wherein the server further includes a second storing section which stores the identification information received by the second receiving section, and the specifying section specifies that, based on the identification information stored in the second storage section, a communication terminal whose identification information has not been received by the first communication terminal is the another communication terminal.

8. The communication system according to claim 1, wherein the predetermined communication protocol is Bluetooth Low Energy, the communication terminals each have a control section which alternatively and sequentially performs one of a sending process of the identification information and a receiving process of the identification information, and the first receiving section receives, in the receiving process, the identification information sent from the second communication terminal which performs the sending process.

9. The communication system according to claim 8, wherein the control section further switches the sending process and the receiving process at regular intervals to alternatively and sequentially perform one of the processes.

10. A communication terminal for performing wireless communication between communication terminals by a predetermined communication protocol, wherein the communication terminal is to be connected with a server through a network and wherein the server specifies, among a plurality of communication terminals, a communication terminal whose identification information has not been received by the communication terminal based on identification information sent from the communication terminals for identifying each communication terminal, the communication terminal comprising:

a receiving section which receives the identification information sent from other communication terminals for identifying each communication terminal; and a sending section which sends the identification information received by the receiving section to the server through the network.

11. A server to be connected with a plurality of communication terminals which perform wireless communication therebetween by a predetermined communication protocol, wherein the communication terminals include a first communication terminal and a second communication terminal, and wherein the first communication terminal receives identification information sent from the second communication terminal to identify the second communication terminal, the server comprising:

a receiving section which receives the identification information sent from the first communication terminals;

a specifying section which specifies identification information of which has not been received by the first communication terminal based on the identification information received by the receiving section.

12. A communication method using a plurality of communication terminals and a server, wherein the communication terminals perform wireless communication therebetween by a predetermined communication protocol, wherein the communication terminals include a first communication terminal and a second communication terminal, and wherein the server is to be connected with the communication terminals through a network, the method comprising:

by the first communication terminal:
receiving identification information sent from the second communication terminal for identifying the second communication terminal; and
sending the received identification information to the server through the network, and by the server:
receiving the identification information sent from the first communication terminal; and
specifying identification information of another communication terminal that has not been received by the first communication terminal based on the received identification information.

13. A computer readable non-transitory recording medium having a program stored thereon which is executable by a computer of a communication terminal, which performs wireless communication with another communication terminal, to perform functions comprising:

receiving identification information sent from another communication terminal for identifying the another communication terminal; and sending, through a network, the identification information to a server which specifies, among a plurality of communication terminals, a communication terminal whose identification information has not been received by the first communication terminal based on identification information sent from communication terminals to the server for identifying each communication terminal.

14. A computer readable non-transitory recording medium having a program stored thereon which is executable by a computer of a server, which is to be connected through a network with a plurality of communication terminals which perform wireless communication therebetween by a predetermined communication protocol and which receive identification information sent from another communication terminal for identifying the another communication terminal, to perform functions comprising:

receiving the identification information sent from the communication terminals for identifying each communication terminal; and specifying, among the communication terminals, a communication terminal whose identification information has not been received by another communication terminal based on the identification information received by the server.

15. An information query method of a communication terminal, wherein the communication terminal performs wireless communication with another communication terminal by a predetermined communication protocol and wherein the communication terminal is to be connected with a server which specifies, among a plurality of communication terminals, a communication terminal whose identification information has not been received by the communication terminal based on identification information sent from the communication terminals for identifying each communication terminal, the information query method comprising:

receiving the identification information sent from other communication terminals for identifying each communication terminal; and sending the identification information received by the communication terminal to the server through a network.

16. An information specifying method of a server which is to be connected with a plurality of communication terminals through a network, wherein the communication terminals perform wireless communication therebetween by a predetermined communication protocol and receive identification information sent from another communication terminal for identifying the another communication terminal, the method comprising:

receiving the identification information sent from the communication terminals for identifying each communication terminal; and specifying, among the communication terminals, a communication terminal whose identification information has not been received by another communication terminal based on the identification information received by the server.

* * * * *